Figure 1:
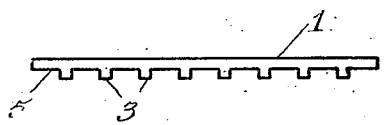

C. C. CARPENTER.
SEPARATOR FOR STORAGE BATTERY PLATES.
APPLICATION FILED JUNE 22, 1912.

1,087,637.

Patented Feb. 17, 1914.

Witnesses:
Robert H. Weir
Geo. B. Jones

Inventor:
Campbell C. Carpenter
by Edwin B. H. Tower Atty.

UNITED STATES PATENT OFFICE.

CAMPBELL C. CARPENTER, OF NIAGARA FALLS, NEW YORK, ASSIGNOR TO THE UNITED STATES LIGHT & HEATING COMPANY, OF NEW YORK, N. Y., A CORPORATION OF MAINE.

SEPARATOR FOR STORAGE-BATTERY PLATES.

1,087,637.         Specification of Letters Patent.         Patented Feb. 17, 1914.

Application filed June 22, 1912. Serial No. 705,236.

*To all whom it may concern:*

Be it known that I, CAMPBELL C. CARPENTER, a citizen of the United States, residing at Niagara Falls, in the county of Niagara and State of New York, have invented new and useful Improvements in Separators for Storage-Battery Plates, of which the following is a full, clear, concise, and exact description, reference being had to the accompanying drawing, forming a part of this specification.

My invention relates to separators for storage battery plates and to a process of making the same.

The object of my invention is to provide an improved separator which will have greater resistance to the action of the electrolyte than heretofore, and which, at the same time, will have the necessary mechanical strength.

Of the various kinds of separators used in the past, those made of wood are objectionable in that the wood structure or fibers break down under chemical action, and those made of hard rubber are too fragile. Other substances which have been employed have proved unsatisfactory in that they are more or less attacked by chemical action and break down, both in structure and composition.

My improvement contemplates a separator having a body of any suitable material, of the requisite strength and toughness, impregnated or coated with rubber to render the same inert to chemical action when immersed in the electrolyte. The body of the separator may consist of any one of a number of materials. I have found that wood is satisfactory, but I contemplate also other materials. For example, cellulose products, asbestos, clays, cements, artificial rubbers, celluloids, or other suitable material. After the wood or other material has been cut or otherwise worked to the proper size and configuration, it is treated with rubber and its solvent by immersing it in a bath of dissolved rubber and allowing it to remain for such a time that the pores of the material are thoroughly saturated or impregnated with the rubber solution. It is then taken out and dried, and if necessary, the operation is repeated until a coating of rubber of sufficient thickness is obtained to protect the underlying material from chemical action.

The saturation process may also be carried out by means of pressure in machines commonly known as impregnating machines. This latter method is much quicker than that of simply soaking under atmospheric pressure. A satisfactory solution may be made from a good commercial grade of rubber and gasolene. Of course, any suitable solvent for the rubber may be employed; for example, acetone, benzol, or acetylene tetrachlorid. After the material has been suitably coated in the manner described, the separator is subjected to any desired process of vulcanization. The vulcanization fixes the rubber and hardens it to a greater or less extent, depending upon the manner of vulcanizing and the equality of the rubber. I prefer to so vulcanize the rubber as to leave it in a rather soft condition. The separators are punched full of holes either before or after the application of the rubber, in order to facilitate the free circulation of the electrolyte. The punching of the holes, however, is preferably performed before the application of the rubber.

The separators may assume any desired form. For purposes of illustration I have shown three forms in the accompanying drawings.

Figure 3:
Figure 2:
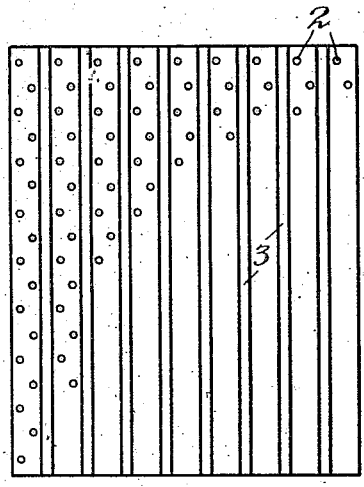
Figure 4:
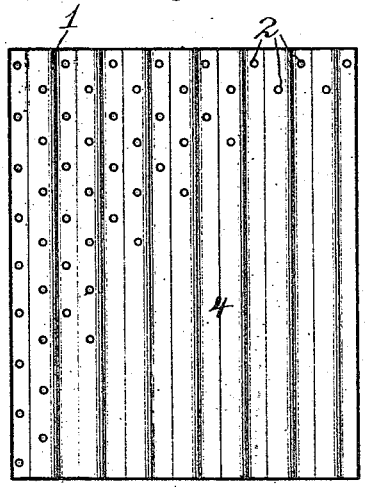
Figure 5:
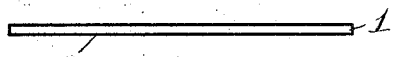
Figure 6:
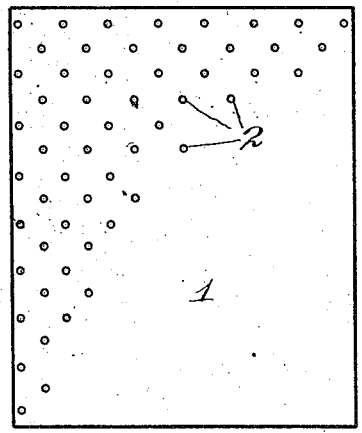

Figures 1 and 2 are a plan view and an elevation respectively, of a separator having ribs on one side only. Figs. 3 and 4 are a plan view and an elevation respectively, of a corrugated separator. Figs. 5 and 6 are a plan view and an elevation respectively of a plain flat separator without ribs.

The separator illustrated in Figs. 1 and 2 comprises a porous base 1, perforated, as at 2, to permit free circulation of the electrolyte, and provided with spacing ribs 3.

Figs. 3 and 4 illustrate a modification, in which corrugations 4 take the place of the spacing ribs 3 of Figs. 1 and 2.

Figs. 5 and 6 illustrate a simple form in which the base 1 is not provided with spacing means.

As previously described, the separator body may be only sufficiently impregnated with the rubber to completely fill up the natural pores in the body, or, by repeated applications of the rubber, a coating 5, completely enveloping the separator body, may be provided. As stated, however, I do not desire to limit myself to any particular size or configuration, as the separators, if provided with ribs, may have the same arranged longitudinally, transversely or diagonally, and arranged either on one side or on both sides of the separator; or the separators may be fluted or undulating; the undulations being in either a vertical or horizontal direction, or arranged at any desired angle. Furthermore, the separators, instead of being made of flat sheets, may be worked into a cylindrical or rectangular form so as to produce retaining cells for the retention of active material.

The above forms are referred to merely for the purpose of suggesting some of the various forms which the separator may assume, and accordingly, I do not desire to limit myself to these forms nor to the details of the process described.

What I claim as new and desire to secure by Letters Patent of the United States is:

1. A storage battery separator having an outer layer of rubber vulcanized thereon.

2. A storage battery separator comprising a thin sheet of wood having a coating of rubber.

3. A storage battery separator comprising a porous supporting element saturated with vulcanized rubber.

4. A storage battery separator comprising a base of porous material, the pores of which are filled with vulcanized rubber.

5. A storage battery separator comprising a sheet or plate of perforated material protected at all points from the action of the electrolyte by a coating of vulcanized rubber.

6. A storage battery separator comprising an outer layer of vulcanized rubber surrounding an inner element more susceptible to the action of the electrolyte than said rubber.

7. The process of manufacturing battery plate separators which consists in perforating a sheet of suitable material, immersing said material in a solution containing rubber to completely cover said material and then vulcanizing said rubber.

8. The process of manufacturing battery plate separators which consists in perforating a sheet of suitable material, immersing said material in a solution containing rubber to impregnate said material and then vulcanizing said rubber.

In witness whereof, I have hereunto subscribed my name in the presence of two witnesses.

CAMPBELL C. CARPENTER.

Witnesses:
EVANGELINE MCCARTHY,
FLOYD D. TAYLOR.